United States Patent
Isono et al.

(10) Patent No.: US 10,279,812 B2
(45) Date of Patent: May 7, 2019

(54) DRIVING FORCE CONTROL SYSTEM FOR VEHICLE

(71) Applicant: Toyota Jidosha Kabushiki Kaisha, Toyota-shi (JP)

(72) Inventors: Hiroshi Isono, Susono (JP); Takanobu Nasu, Sagamihara (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 328 days.

(21) Appl. No.: 15/373,529

(22) Filed: Dec. 9, 2016

(65) Prior Publication Data

US 2017/0183008 A1    Jun. 29, 2017

(30) Foreign Application Priority Data

Dec. 25, 2015 (JP) ................................. 2015-253254

(51) Int. Cl.
*B60W 30/188* (2012.01)
*B60L 11/14* (2006.01)
(Continued)

(52) U.S. Cl.
CPC ............ *B60W 30/188* (2013.01); *B60L 11/14* (2013.01); *B60L 15/20* (2013.01); *B60L 15/2009* (2013.01);
(Continued)

(58) Field of Classification Search
None
See application file for complete search history.

(56) References Cited

U.S. PATENT DOCUMENTS 6,321,144 B1* 11/2001 Crombez ............ B60L 15/2009
701/22
2004/0108770 A1* 6/2004 Maki ......................... B60L 7/26
303/116.4
(Continued)

FOREIGN PATENT DOCUMENTS

EP       0 965 511 A2    12/1999
JP       2006-46495 A    2/2006
(Continued)

OTHER PUBLICATIONS

Japanese Office Action issued in Japanese Patent Application No. 2015-253254 dated Feb. 27, 2018, (w/ English Translation).
(Continued)

*Primary Examiner* — David P. Merlino
(74) *Attorney, Agent, or Firm* — Oblon, McClelland, Maier & Neustadt, LLP (57) ABSTRACT

A driving force control system for a vehicle is provided to control an output torque of a prime mover and a torque split ratio to right and left wheels to improve stability of the vehicle. A controller is calculates target torques delivered to the right wheel and the left wheel based on a required drive torque and data relating to an attitude of the vehicle, and corrects the target torques based on slip ratios of the wheels. The drive motor is control based on a first current value calculated based on a total torque of the corrected target torques to be delivered the wheels, and the differential motor is controlled based on a second current value calculated based on a difference between the corrected target torques to be delivered to the wheels.

5 Claims, 10 Drawing Sheets

(51) Int. Cl.
  *B60L 15/20*   (2006.01)
  *B60W 10/08*   (2006.01)
  *B60W 10/16*   (2012.01)
  *B60W 30/18*   (2012.01)
  *B60W 10/04*   (2006.01)

(52) U.S. Cl.
  CPC ......... *B60L 15/2036* (2013.01); *B60W 10/04* (2013.01); *B60W 10/08* (2013.01); *B60W 10/16* (2013.01); *B60W 30/18145* (2013.01); *B60W 30/18172* (2013.01); *B60L 2240/12* (2013.01); *B60L 2240/16* (2013.01); *B60L 2240/18* (2013.01); *B60L 2240/22* (2013.01); *B60L 2240/24* (2013.01); *B60L 2240/423* (2013.01); *B60L 2240/461* (2013.01); *B60L 2250/26* (2013.01); *B60W 2510/083* (2013.01); *B60W 2510/12* (2013.01); *B60W 2520/26* (2013.01); *B60W 2520/266* (2013.01); *B60W 2520/28* (2013.01); *B60W 2540/10* (2013.01); *B60W 2540/12* (2013.01); *B60W 2710/083* (2013.01); *B60W 2710/12* (2013.01); *B60W 2720/14* (2013.01); *B60W 2720/406* (2013.01); *Y02T 10/645* (2013.01); *Y02T 10/72* (2013.01); *Y02T 10/7275* (2013.01)

(56) References Cited

U.S. PATENT DOCUMENTS

| | | | |
|---|---|---|---|
| 2006/0196712 A1* | 9/2006 | Toyota | B60W 30/18145 180/165 |
| 2012/0265419 A1* | 10/2012 | Kim | B60L 3/104 701/71 |
| 2014/0277983 A1* | 9/2014 | Bayar | B60L 7/18 701/71 |
| 2015/0291038 A1* | 10/2015 | Akiyama | B60L 3/102 701/22 |
| 2016/0214486 A1* | 7/2016 | Suzuki | B60T 8/175 |
| 2017/0267106 A1* | 9/2017 | Erban | B60W 30/18127 |

FOREIGN PATENT DOCUMENTS

| | | |
|---|---|---|
| JP | 2007-313982 A | 12/2007 |
| JP | 2010-144762 A | 7/2010 |
| JP | 2011-163519 | 8/2011 |
| JP | 2013-258819 A | 12/2013 |

OTHER PUBLICATIONS

Japanese Notice of Allowance Action issued in Japanese Patent Application No. 2015-253254 dated Sep. 4, 2018, (w/ English Translation).

* cited by examiner

DRIVING FORCE CONTROL SYSTEM FOR VEHICLE

CROSS REFERENCE TO RELATED APPLICATIONS

The present application claims the benefit of priority to Japanese Patent Application No. 2015-253254 filed on Dec. 25, 2015 with the Japanese Patent Office, the entire contents of which are incorporated herein by reference in its entirety.

BACKGROUND

Field of the Disclosure

Embodiments of the present application relate to the art of a driving force control system for a vehicle configured to control a torque distribution ratio to right and wheels.

Discussion of the Related Art

JP-A-2011-163519 describes a yaw moment control device for a vehicle having a differential unit for distributing torque of a prime mover to right and left wheels. According to the teachings of JP-A-2011-163519, the differential unit is provided with a pair of frictional engagement devices for altering a torque split ratio to a right driving wheel and to a left driving wheel. Specifically, torque distributed to the right driving wheel is increased by increasing frictional engagement force of the right frictional engagement device, and torque distributed to the left driving wheel is increased by increase frictional engagement force of the left frictional engagement device. For example, during accelerating the vehicle while turning, the torque distributed to the outer wheel is decreased based on a slip ratio of the outer wheel. By contrast, during decelerating the vehicle while turning, the torque distributed to the inner wheel is increased based on a slip ratio of the inner wheel.

According to the teachings of JP-A-2011-163519, when the differential unit increases torque delivered to one of the driving wheels, the differential unit decreases torque delivered to the other driving wheel. Likewise, when the differential unit decreases torque delivered to one of the driving wheels, the differential unit increases torque delivered to the other driving wheel. In this situation, however, the torque split ratio is controlled based simply on the slip ratio of one of the driving wheels. That is, although the torque of said one of the driving wheels can be optimized, the torque of the other driving wheel may not be controlled properly. For this reason, traveling stability of the vehicle may be degraded if the torque of said other driving wheel is increased or decreased excessively.

SUMMARY

Aspects of the present disclosure have been conceived noting the foregoing technical problems, and it is therefore an object of the present application is to provide a driving force control system for a vehicle that is configured to control an output torque of a prime mover and a torque split ratio to right and left wheels to improve stability of the vehicle.

Embodiments of the present application relates to driving force control system for a vehicle comprising: a drive motor; a differential unit having a plurality of rotary elements that distributes torque delivered from the drive motor to a right wheel and a left wheel; a differential motor that is connected to any one of rotary elements of the differential unit, and that controls a split ratio of the torque distributed to the right wheel and the left wheel through the differential unit by generating torque; and a controller that controls electric currents supplied to the drive motor and the differential motor. In order to achieve the above-explained objective, the controller is configured to: calculate a drive torque that is required by a driver including an accelerating torque and a decelerating torque based on an operation executed by a driver; calculate target torques to be delivered to the right wheel and the left wheel based on the drive torque and data relating to an attitude of the vehicle; correct the target torques based on a detected slip ratio of each of the right wheel and the left wheel; calculate a first current value supplied to the drive motor based on a total torque of the corrected target torque to be delivered to one of the wheels and the corrected target torque to be delivered to the other wheel; calculate a second current value supplied to the differential motor based on a difference between the corrected target torque to be delivered to one of the wheels and the corrected target torque to be delivered to the other wheel; and control the drive motor based on the first current value and the differential motor based on the second current value.

In a non-limiting embodiment, the driving force control system may further comprises a brake device that is connected to any one of rotary elements of the differential unit to apply a brake torque to the rotary element in accordance with a current applied thereto. In addition, the controller may be further configured to control a current value supplied to the brake device, and calculate a third current value supplied to the brake device based on the total torque of the corrected target torques.

In a non-limiting embodiment, the drive motor may include a motor having a generating function. In addition, the controller may be further configured to calculate the first current value in such a manner as to generate a limit torque of the drive motor, and to calculate the third current value in such a manner as to generate a difference between the total torque of the corrected target torques and the limit torque of the drive motor by the brake device, in a case that the total torque of the corrected target torques is a brake torque that is greater than the limit torque of the drive motor.

In a non-limiting embodiment, the controller may be further configured to calculate the target torques in such a manner as to increase the torque of one of the wheels while decreasing the torque of the other wheel in the same amount during turning of the vehicle.

In a non-limiting embodiment, the operation may include an accelerating operation and a braking operation executed by the driver.

In a non-limiting embodiment, the data relating to an attitude of the vehicle may include a yaw rate of the vehicle.

In a non-limiting embodiment, the slip ratio may include a ratio between a vehicle speed and a wheel speed of each of the wheel.

Thus, according to the embodiment of the present application, the first current value supplied to the drive motor and the second current value supplied to the differential motor are calculated based on the slip ratios of the right and left wheels. According to the embodiment, therefore, even if the torque split ratio is changed and hence the torque of one of the right and left wheels is changed, the torque of the other wheel will not be increased or decreased excessively. For this reason, running stability of the vehicle can be improved.

As described, the drive motor has a generating function, and the brake device for apply a brake torque to the rotary element of the differential unit. In addition, in the case that the total torque of the corrected target torques is a brake torque that is greater than the limit torque of the drive motor, the controller calculates the first current value in such a manner as to generate a limit torque of the drive motor, and calculates the third current value in such a manner as to generate a difference between the total torque of the corrected target torques and the limit torque of the drive motor by the brake device. According to the embodiment, therefore, an energy regeneration efficiency may be improved while reducing the brake torque to be established by the brake device. For this reason, the brake device may be downsized, or damages on the brake device may be limited.

As also described, the controller calculates the target torques in such a manner as to increase the torque of one of the wheels while decreasing the torque of the other wheel in the same amount during turning of the vehicle. According to the embodiment, therefore, turning performance of the vehicle may be improved without reducing longitudinal acceleration.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Figure 5:
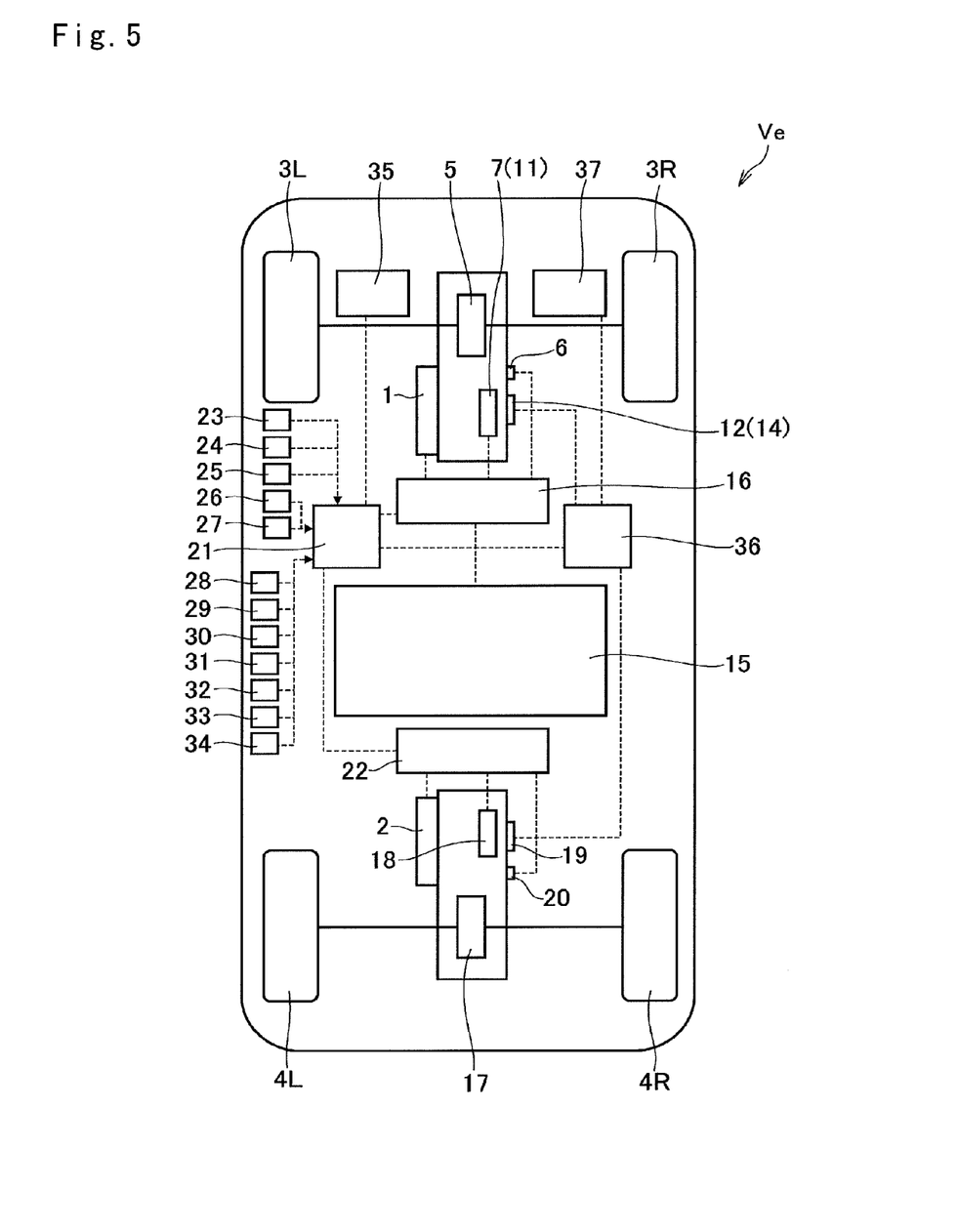
FIG. 5 is a schematic illustration showing one example of the control system according to the present application.

Preferred embodiments of the present application will now be explained with reference to the accompanying drawings. Referring now to FIG. 5, there is schematically shown a structure of the control system according to the preferred embodiment of the present application. Here, in FIG. 1, dashed-lines indicate electrical connections. As illustrated in FIG. 5, a vehicle Ve is provided with a first drive motor 1 and a second drive motor 2. For example, a permanent magnet synchronous motor used in the conventional hybrid vehicles and electric vehicles may be used individually as the first drive motor 1 and the second drive motor 2. Specifically, the first drive motor 1 is disposed on a center of width in a front part of the vehicle Ve to deliver torque to a right front wheel 3R and a left front wheel 3L, and the second drive motor 2 is disposed on a center of width in a rear part of the vehicle Ve to deliver torque to a right rear wheel 4R and a left rear wheel 4L.

A first differential unit 5 as a planetary gear unit is connected to the first motor 1 to distribute output torque of the first motor 1 to the right front wheel 3R and to the left front wheel 3L. In order to control a torque split ratio to the right front wheel 3R and the left front wheel 3L, a first differential motor 6 is connected to the first differential unit 5 in such a manner as to apply output torque of the first differential motor 6 to any one of rotary elements of the first differential unit 5. Specifically, torque distributed to any one of the right front wheel 3R and the left front wheel 3L is increased by applying the torque of the first differential motor 6 to the first differential unit 5, and torque distributed to the other front wheel 3R or 3L is decreased in inverse proportion to the increase in said one of the front wheels 3R and 3L. Thus, the first differential unit 5 and the first differential motor 6 serve as a torque vectoring device. For example, the torque vectoring device of this kind is described in PCT international publication WO 2015/008661. Thus, the torque split ratio is a distribution rate of output torque of the first drive motor 1 to one of the front wheels 3R and 3L.

Figure 6:
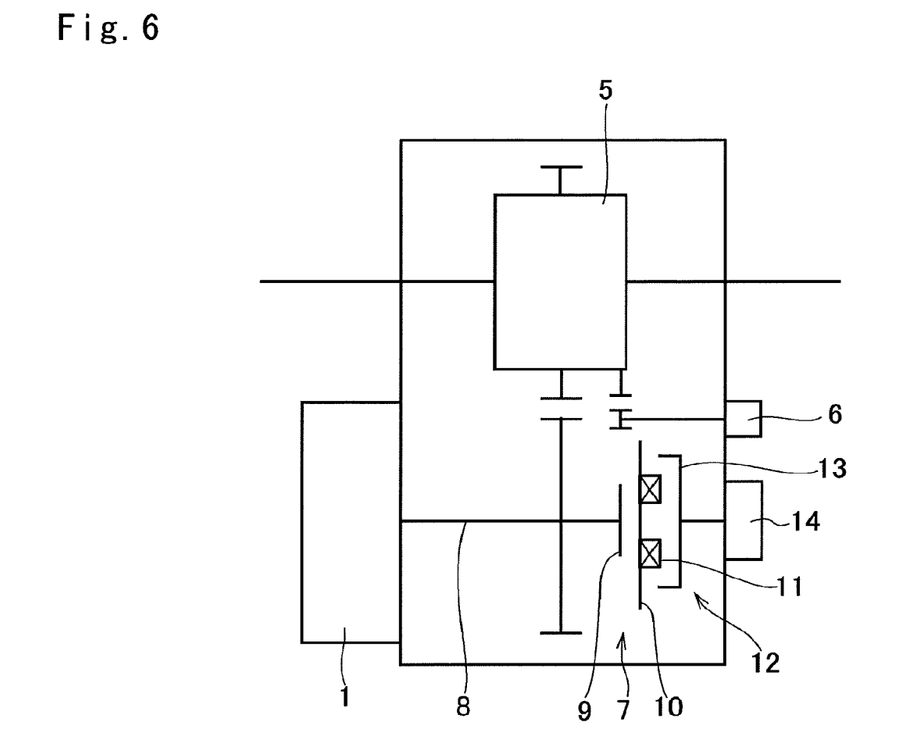
FIG. 6 is a schematic illustration showing a structure for applying torque and brake torque from the first motor to the front wheels.

A first brake device 7 is arranged at a position to be contacted to an input element of the first differential unit 5 or a rotary member attached to the first motor 1 connected to the first differential unit 5 to establish a frictional braking force. Turning to FIG. 6, there is shown a structurer of the first brake device 7 used in the control system shown in FIG. 5. As illustrated in FIG. 6, a plate member 9 as a brake rotor is attached to a leading end of the output shaft 8 of the first motor 1, and the first brake device 7 is disposed at a position to apply brake torque to the plate member 9. The first brake device 7 comprises a brake disc 10 and a coil 11 as an electromagnetic actuator that is attached to the brake disc 10. When the coil 11 is energized, the brake disc 10 is brought into contact to the plate member 9 by an electromagnetic force established by the coil 11.

The brake torque thus established by the first brake device 7 is applied to the right front wheel 3R and the left front wheel 3L through the first differential unit 5. In this situation, a split ratio of brake torque to the right front wheel 3R and the left front wheel 3L may be altered by controlling the first differential motor 6.

When the vehicle Ve is parked, the vehicle Ve is powered off and hence the first brake device 7 cannot maintain the braking force during parking. In order to maintain the braking force when the vehicle Ve is powered off, the vehicle Ve is provided with a first parking lock device 12. As illustrated in FIG. 6, the first parking lock device 12 comprises a pushing member 13 that pushes the brake disc 10 toward the plate member 9, and an electromagnetic actuator 14 that moves forward the pushing member 13 to bring the brake disc 10 into contact to the plate member 9 when energized and that fixes a position of the pushing member 13 when unenergized.

That is, a contact pressure between the brake disc 10 and the plate member 9 as the brake torque may be controlled in accordance with a travel amount of the pushing member 13 while energizing the electromagnetic actuator 14, and the braking force thus established may be maintained by stopping current supply to the electromagnetic actuator 14. Thus, in the vehicle Ve, the brake torque may also be ensured by first parking lock device 12 instead of the first brake device 7.

Turning back to FIG. 5, the first drive motor 1, the first differential motor 6 and the first brake device 7 are connected to a high-voltage storage device 15 such as a battery and a capacitor. In the vehicle Ve, therefore, an electric power is supplied to the first drive motor 1, the first differential motor 6 and the first brake device 7 from the storage device 15, and an electric power generated by the first drive motor 1 is delivered to the storage device 15. In order to convert between direct current and alternate current, and to control a value and a frequency of the current supplied to the first drive motor 1, the first differential motor 6 and the coil 11, a first inverter 16 is interposed between the storage device 15 and the first motor 1 and the first differential motor 6.

A second differential unit 17 also as a planetary gear unit is connected to the second drive motor 2 to distribute output torque of the second drive motor 2 to the right rear wheel 4R and the left rear wheel 4L. A second brake device 18 is also arranged at a position to be contacted to an input element of the second differential unit 17 or a rotary member attached to the second drive motor 2 connected to the second differential unit 17 to establish a brake torque. The brake torque established by the second brake device 18 is applied to the right rear wheel 4R and the left rear wheel 4L through the second differential unit 17. A split ratio of brake torque to the right rear wheel 4R and the left rear wheel 4L may also be altered by controlling a second differential motor 20 connected to the second differential unit 17. A second parking lock device 19 having a same structure as the first parking lock device 12 is also arranged to ensure braking force even when a failure occurs on an electrical system for supplying electric power to the second brake device 18. Thus, the right rear wheel 4R and the left rear wheel 4L are driven and stopped by same principles as the right front wheel 3R and the left front wheel 3L. A second inverter 22 is also interposed between the storage device 15 and the second drive motor 2 and the second differential motor 20, so as to convert between direct current and alternate current, and to control a value and a frequency of the current supplied to the second motor 2, the second differential motor 20 and etc.

In order to control the first drive motor 1, the second drive motor 2, the first differential motor 6, the second differential motor 20, the first brake device 7 and the second brake device 18, a first electronic control unit (to be abbreviated as the "first ECU" hereinafter) 21 as a controller is electrically connected to those members. The first ECU 21 is composed mainly of a microcomputer, and functions of the first ECU 21 are shown in FIG. 7.

Figure 7:
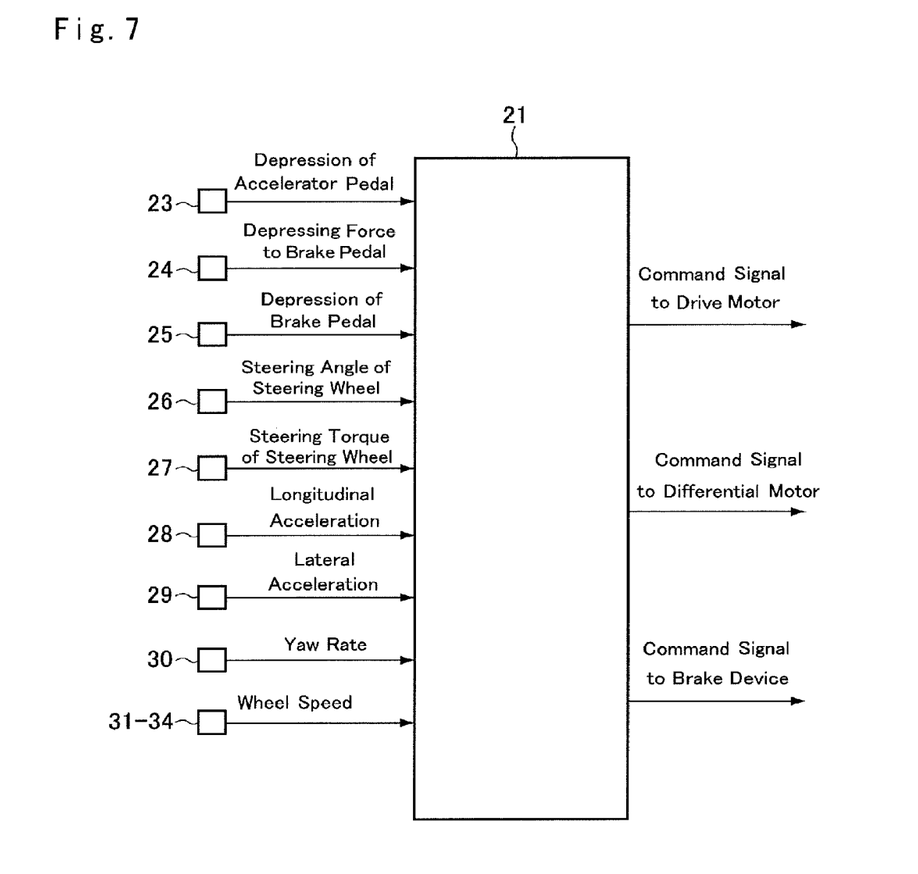
FIG. 7 is a block diagram showing functions of the first ECU.

As shown in FIG. 7, signals representing an attitude of the vehicle Ve and details of driver's operations are sent to the first ECU 21. The first ECU 21 is configured to compute target values of vehicle behaviors based on the incident signals using formulas and maps installed therein, and to transmit command signals to the motors and brake devices through the first inverter 16 and the second inverter 22. Specifically, the first ECU 21 compute the control signals in such a manner as to execute an anti-lock brake control, a traction control, an electronic stability control, a dynamic yaw rate control and so on.

For example, the first ECU 21 receives detection signals representing details of driver's operations from an accelerator sensor 23 for detecting a depression of an accelerator pedal, a first brake sensor 24 for detecting a depressing force applied to a brake pedal, a second brake sensor 25 for detecting a depression of the brake pedal, a steering sensor 26 for detecting a steering angle of a steering wheel, and a steering torque sensor 27 for detecting a steering torque of the steering wheel. The first ECU 21 also receives detection signals representing an attitude of vehicle Ve from a first acceleration sensor 28 for detecting longitudinal acceleration of the vehicle Ve, a second acceleration sensor 29 for detecting lateral acceleration of the vehicle Ve, a yaw rate sensor 30 for detecting a yaw rate of the vehicle Ve, a first wheel speed sensor 31 for detecting a speed of the right front wheel 3R, a second wheel speed sensor 32 for detecting a speed of the left front wheel 3L, a third wheel speed sensor 33 for detecting a speed of the right rear wheel 4R, and a fourth wheel speed sensor 34 for detecting a speed of the left rear wheel 4L.

In order to operate the first ECU 21 and to supply an electric power to a not shown transistor of the first inverter 16, the vehicle Ve is further provided with a first auxiliary battery 35 whose voltage is lower than that of the storage device 15.

Figure 8:
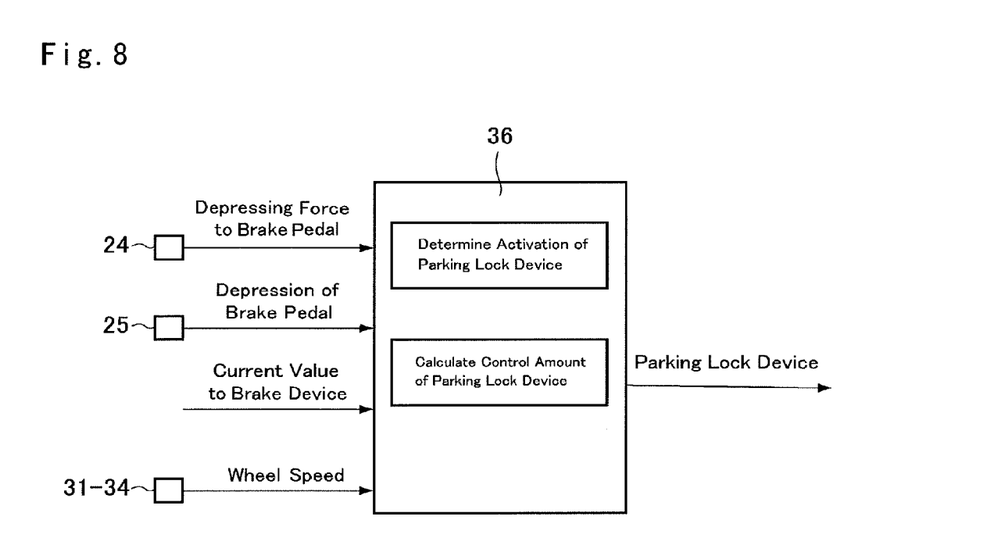
FIG. 8 is a block diagram showing functions of the second ECU.

When a failure occurs on the electrical system between the first ECU 21 and the first auxiliary battery 35 or the first inverter 16, the first parking lock device 12 and the second parking lock device 19 are controlled by a second electronic control unit (to be abbreviated as the "second ECU" hereinafter) 36 as a second controller to ensure breaking force. The second ECU 36 is also composed mainly of a microcomputer, and functions of the second ECU 36 are shown in FIG. 8. As shown in FIG. 8, signals representing an attitude of the vehicle Ve and details of driver's operations are also sent to the second ECU 36. The second ECU 36 is configured to determine actuation of the first parking lock device 12 and the second parking lock device 19, and to calculate control amounts of the first parking lock device 12 and the second parking lock device 19 based on the incident signals using formulas and maps installed therein. The calculated control amounts are transmitted to the first parking lock device 12 and the second parking lock device 19 in the form of command signals.

To this end, the signals representing details of driver's operations are also sent to the second ECU 36. Specifically, the second ECU 36 receives detection signals from the first brake sensor 24, the second brake sensor 25, and not shown sensors for detecting current values of the first brake device 7 and the second brake device 18. Also, the signals representing vehicle behaviors such as direction signals of the wheel speed sensors 31 to 34 are sent to the second ECU 36. Specifically, the second ECU 36 is configured to actuate the first parking lock device 12 and the second parking lock device 19 based on at least one of the following facts that: (i) the vehicle Ve has been parked longer than a predetermined period of time; (ii) a switch to actuate the electromagnetic actuator 14 is turned on by a driver or passenger; (iii) an ignition is turned off during parking; and (iv) at least any one of the first brake device 7 and the second brake device 18 cannot be activated. The second ECU 36 is further configured to calculate target brake torques to be achieved by the first parking lock device 12 and the second parking lock device 19 based on a depressing force and a depression of the brake pedal and speeds of the wheels 3R, 3L, 4R and 4L, and to supply current to electromagnetic actuators (not shown) of the first parking lock device 12 and the second parking lock device 19 to achieve the calculated brake torques. In order to operate the second ECU 36, and to supply an electric power to the first parking lock device 12 and the second parking lock device 19, the vehicle Ve is further provided with a second auxiliary battery 37. The command signal may be transmitted between the first ECU 21 and the second ECU 36. For example, the second ECU 36 is allowed to be operated when a failure occurs on the first ECU 21.

Figure 1:
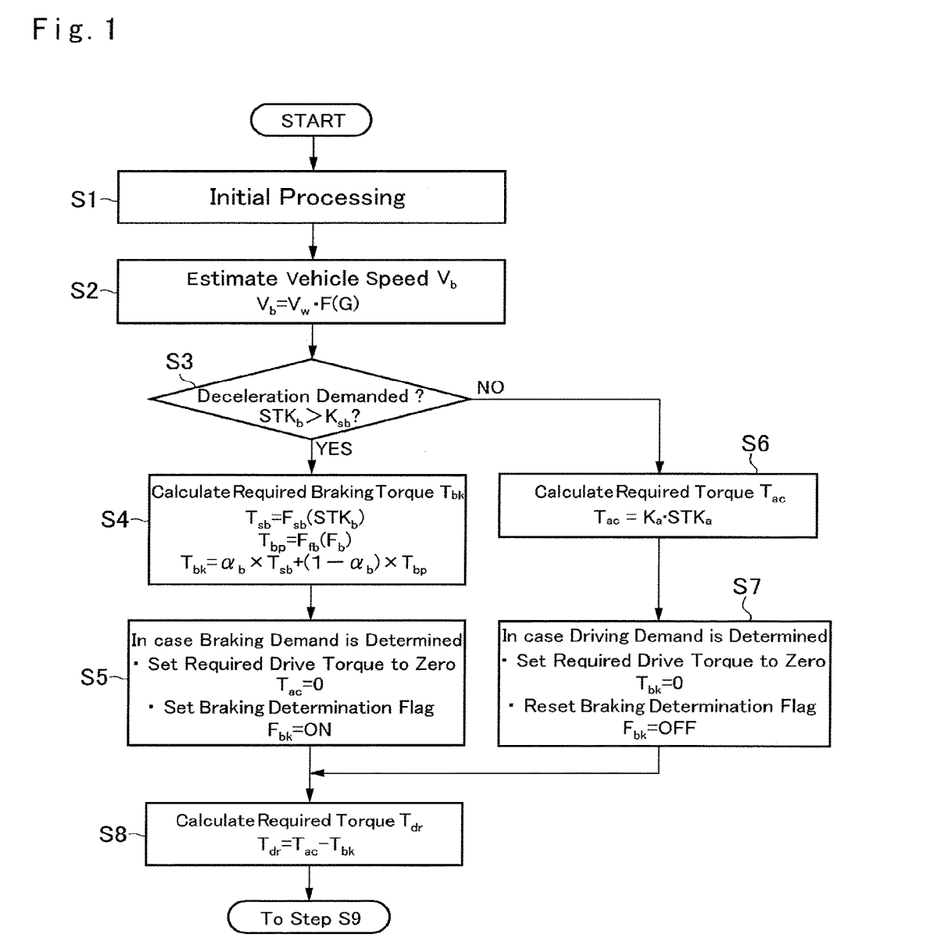
FIG. 1 is a flowchart showing one example of a routine for calculating torque required by the driver.

Here will be explained procedures of calculating current values to activate the first drive motor 1, the second drive motor 2, the first differential motor 6 and the second differential motor 18 with reference to FIGS. 1 to 4, and the routines shown in FIGS. 1 to 4 are executed by the first ECU 21. It is to be noted that the routines shown in FIGS. 1 to 4 may be executed consecutively, but will be explained separately for the sake of explanation. Turning now to FIG. 1, there is shown a routine for calculating a torque required by the driver. Specifically drive torque for accelerating and decelerating the vehicle Ve is calculated by the routine shown in FIG. 1.

As an initial processing, a the incident signals from the above-explained sensors 23, 24, 25, 26, 27, 28, 29, 30, 31, 23, 33 and 34 are read at step S1. Then, a vehicle speed $V_b$ is estimated at step S2 using the following formula:

$$V_b = V_w \cdot F(G)$$

where "$V_w$" is a wheel speed and "G" is a longitudinal acceleration. To this end, not only an average speed of the wheels 3R, 3L, 4R and 4L but also any one of a speed of the wheels 3R, 3L, 4R and 4L may be employed as the wheel speed $V_w$.

Then, at step S3, a depression $STK_b$ of the brake pedal is compared to a predetermine threshold value $K_{sb}$ to determine whether or not the driver intends to decelerate the vehicle Ve. To this end, the threshold value $K_{sb}$ may be determined based on an experimental result, and the depression $STK_b$ of the brake pedal may be detected by the first brake sensor 24.

Figure 9:
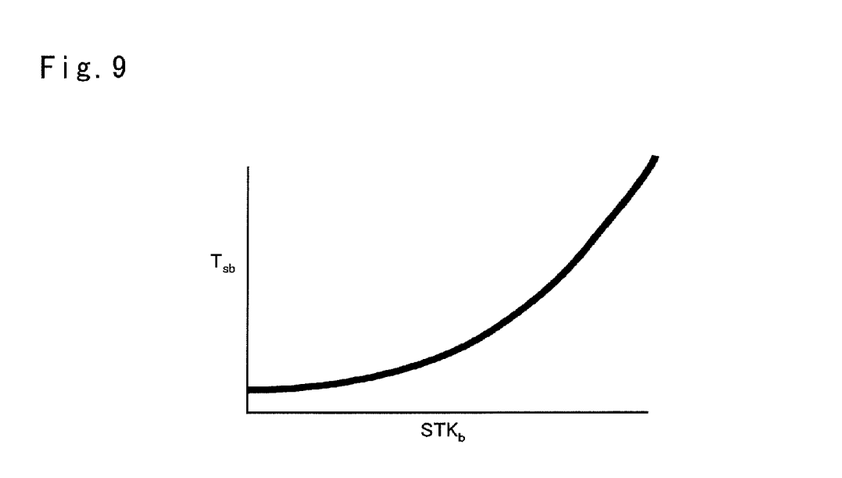
FIG. 9 shows one example of a map for calculating brake torque based on a depression of a brake pedal.

If the depression $STK_b$ of the brake pedal is greater than the threshold value $K_{sb}$ so that the answer of step S3 is YES, the routine progresses to step S4 to calculate a brake torque $T_{bk}$ required by the driver. At step S4, first of all, a brake torque $T_{sb}$ based on the depression $STK_b$ of the brake pedal is obtained with reference to a map shown in FIG. 9 that is installed in the first ECU 21. The map shown in FIG. 9 is prepared based on an experimental result, and as can be seen from FIG. 9, the brake torque $T_{sb}$ is increased in a quadratic manner with an increase in the depression $STK_b$ of the brake pedal.

Figure 10:
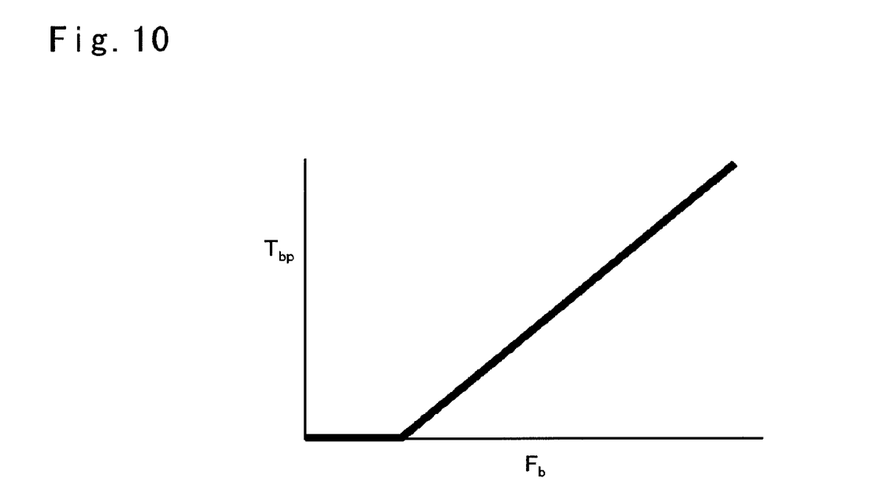
FIG. 10 shows one example of a map for calculating brake torque based on a depressing force applied to the brake pedal.

Then, a brake torque $T_{bp}$ based on a depressing force $F_b$ applied to the brake pedal is obtained with reference to a map shown in FIG. 10. As can be seen from FIG. 10, the brake torque $T_{bp}$ is set to zero until the depressing force $F_b$ applied to the brake pedal is increased to a predetermined value, and increased in proportion to an increase in the depressing force $F_b$ upon exceedance of the predetermined value.

Figure 11:
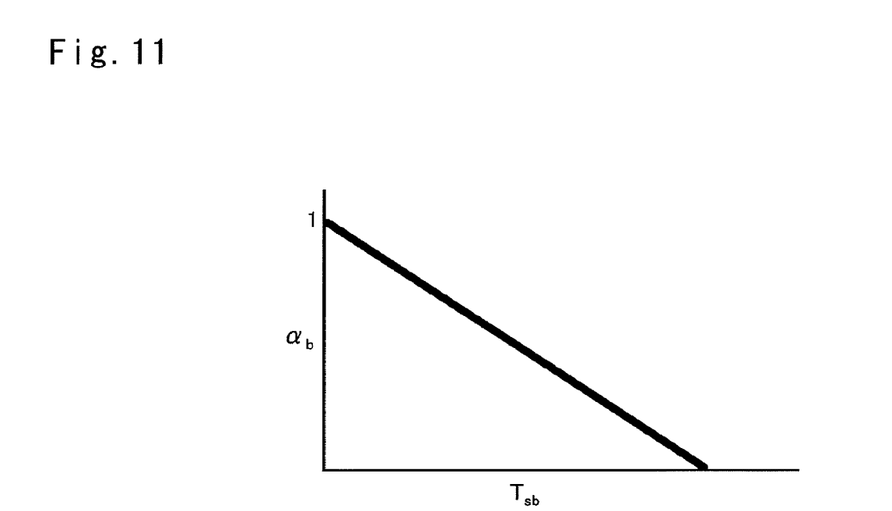
FIG. 11 shows one example of a map for calculating a contributing ratio of brake torque based on a depression of a brake pedal.

Thereafter, the brake torque $T_{bk}$ required by the driver is calculated based on the brake torque $T_{sb}$ and the brake torque $T_{bp}$ using the following formula:

$$T_{bk} = a_b \cdot T_{sb} + (1-a_b) \cdot T_{bp}$$

where "$a_b$" is a contributing ratio of the brake torque $T_{sb}$ to calculate the brake torque $T_{bk}$ required by the driver. To this end, the contributing ratio $a_b$ is determined with reference to a map shown in FIG. 11. As can be seen from FIG. 11, the contributing ratio $a_b$ is reduced in proportion to an increase in the brake torque $T_{sb}$.

In a case that the braking demand of the driver is thus determined, after calculating the brake torque $T_{bk}$ required by the driver, the routine progresses to step S5 to set a drive torque $T_{ac}$ required by the driver to "0", and to turn on a brake demand determination flag $F_{bk}$.

By contrast, if the depression $STK_b$ of the brake pedal is smaller than the threshold value $K_{sb}$ so that the answer of step S3 is NO, the routine progresses to step S6 to calculate the drive torque $T_{ac}$ required by the driver using the following formula:

$$T_{ac} = K_a \cdot STK_a$$

where "$K_a$" is a predetermined coefficient used to convert a depression $STK_a$ of the accelerator pedal into the drive torque $T_{ac}$ required by the driver.

In a case that the driving demand of the driver is thus determined, after calculating the drive torque $T_{ac}$ required by the driver, the routine progresses to step S7 to set the brake torque $T_{bk}$ required by the driver to "0", and to turn off the brake demand determination flag $F_{bk}$.

After thus calculating the brake torque $T_{bk}$ required by the driver or the drive torque $T_{ac}$ required by the driver, the routine progresses to step S8 to calculate a required torque $T_{dr}$ of the vehicle Ve using the following formula:

$$T_{dr} = T_{ac} - T_{bk}$$

Such calculation at step S8 is executed to calculate the torques for propelling in both forward and backward directions integrally. To this end, at step S8, the torque to accelerate the vehicle Ve in the forward direction is set to a positive value, and the torque to decelerate the vehicle is converted into negative value. That is, since a value of the brake torque $T_{bk}$ calculated at step S4 is positive, the brake torque $T_{bk}$ is converted into a negative value at step S8. Accordingly, the required torque $T_{dr}$ calculated at step S8 corresponds to the claimed "drive torque".

After thus calculating the required torque $T_{dr}$ of the vehicle Ve, data relating to an attitude of the vehicle Ve such as a torque $T^r_{di}$ to be delivered to the right wheels (i.e., a total torque of output torques of the right front wheel 3R and the right rear wheel 4R), and a torque $T^l_{di}$ to be delivered to the left wheels (i.e., a total torque of output torques of the left front wheel 3L and the left rear wheel 4L) are calculated to improve running stability of the vehicle Ve during turning. To this end, the routine progresses to a routine shown in FIG. 2. Specifically, in order to carry out the electronic stability control and the dynamic yaw rate control, the torque $T^r_{di}$ and the torque $T^l_{di}$ are calculated based on an actual yaw rate detected by the yaw rate sensor 30.

Figure 2:
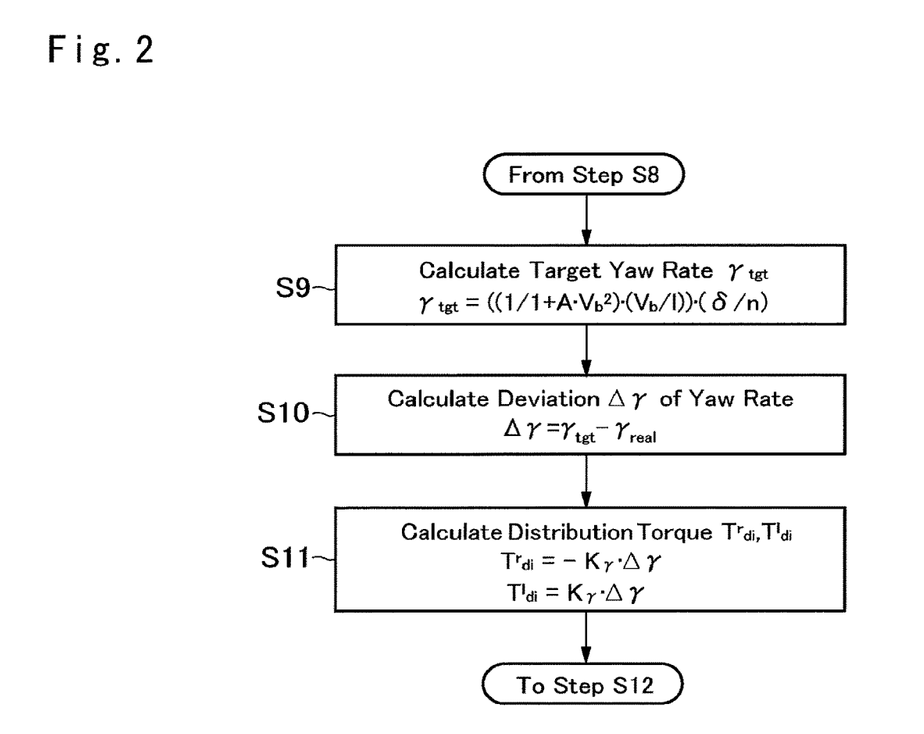
FIG. 2 is a flowchart showing one example of a routine for calculating a torque split ratio to right and left wheels.

In the routine shown in FIG. 2, first of all, a target yaw rate $\gamma_{tgt}$ is calculated at step S9 based on a steering angle $\delta$ using the following formula:

$$\gamma_{tgt} = ((1/1 + A \cdot V_b^2) \cdot (V_b/l)) \cdot (\delta/n)$$

where "A" is a stability factor, "l" is a wheel base, and "n" is a gear ratio of the steering wheel.

Then, a deviation $\Delta\gamma$ between the target yaw rate $\gamma_{tgt}$ calculated at step S9 and an actual yaw rate $\gamma_{real}$ is calculated at step S10. Thereafter, in order to achieve the target yaw rate $\gamma_{tgt}$, the torque $T^r_{di}$ to be delivered to the right wheels and the torque $T^l_{di}$ to be delivered to the left wheels are calculated at step S11 using the following formulas:

$$T^r_{di} = -K_\gamma \cdot \Delta_\gamma; \text{ and}$$

$$T^l_{di} = K_\gamma \cdot \Delta \gamma$$

where "$K_\gamma$" is a partition coefficient of the torque to be distributed to the right wheels and the left wheels that is stored in the first ECU 21. Here, in the following description, the torque thus calculated at step S11 will be called the "distribution torque".

For example, when the differential unit 5 shown in FIGS. 5 and 6 increases the torque delivered to the right front wheel 3R, the differential unit 5 decreases the torque delivered to the left front wheel 3L in the same amount. At step S11, therefore, the torque $T^r_{di}$ and the torque $T^l_{di}$ are calculated in such a manner that the torques to be delivered to the right wheels and the left wheels are increased and decreased in the same amount.

Then, a current value $I^{*m}$ supplied to the drive motors 1 and 2, a current value $I^{*s}$ supplied to the differential motors 6 and 20, and a current value $I^{*b}$ supplied to the brake devices 7 and 18 are calculated based on the required torque $T_{dr}$ and the distribution torques $T^r_{di}$ and $T^l_{di}$. To this end, specifically, command drive torques $T^i_{wla}$ and command drive torques $T^i_{wlb}$ to the wheels 3R, 3L, 4R and 4L are calculated by a routine shown in FIG. 3, and the current values $I^{*m}$, $I^{*s}$ and $I^{*b}$ are calculated by a routine shown in FIG. 4.

Figure 3:
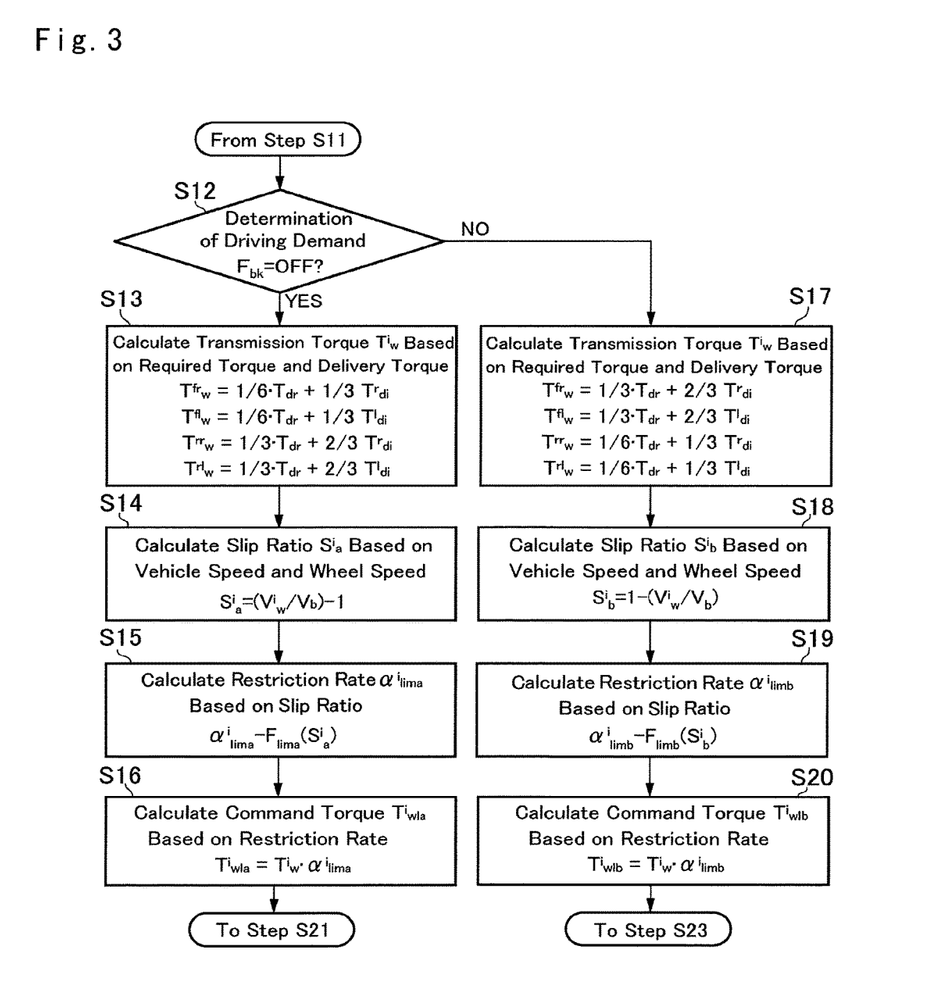
FIG. 3 is a flowchart showing one example of a routine for correcting the required torque based on a slip ratio.

In the routine shown in FIG. 3, first of all, it is determined at step S12 whether or not the aforementioned brake demand determination flag $F_{bk}$ is turned off, in other words, it is determined whether or not the drive torque is required by the driver.

If the drive torque is required by the driver so that the answer of step S12 is YES, the routine progresses to step S13 to calculate a transmission torque to each of the wheel. At step S13, specifically, a transmission torque $T^{fr}_w$ to the right front wheel 3R, a transmission torque $T^{fl}_w$ to the left front wheel 3L, a transmission torque $T^{rr}_w$ to the right rear wheel 4R, and a transmission torque $T^{rl}_w$ to the left rear wheel 4L are individually calculated based on the required torque $T_{dr}$ calculated at step S8, and the torque $T^r_{di}$ to be delivered to the right wheels and the torque $T^l_{di}$ to be delivered to the left wheels, using the following formulas:

$$T^{fr}_w = \tfrac{1}{6} \cdot T_{dr} + \tfrac{1}{3} T^r_{di};$$

$$T^{fl}_w = -\tfrac{1}{6} \cdot T_{dr} + \tfrac{1}{3} T^l_{di};$$

$$T^{rr}_w = \tfrac{1}{3} \cdot T_{dr} + \tfrac{2}{3} T^r_{di}; \text{ and}$$

$$T^{rl}_w = \tfrac{1}{3} \cdot T_{dr} + \tfrac{2}{3} T^l_{di}.$$

Here, when generating the drive torque, a larger vertical force is applied to each of the right rear wheel 4R and the left rear wheel 4L. In this case, therefore, a split ratio of the transmission torque $T^{fr}_w$ to the right front wheel 3R to the transmission torque $T^{rr}_w$ to the right rear wheel 4R is set to a ratio of 1 to 2. Likewise, a split ratio of the transmission torque $T^{fl}_w$ to the left front wheel 3L to the transmission torque $T^{rl}_w$ to the left rear wheel 4L is also set to a ratio of 1 to 2. However, the split ratio of the transmission torque to the front wheel to the transmission torque to the right rear wheel may be adjusted according to need.

Then, a slippage of each wheel caused by generating the drive torque is detected at step S14. At step S14, specifically, a slip ratio $S^i_a$ of each of the right front wheel 3R, the left front wheel 3L, the right rear wheel 4R and the left rear wheel 4L is individually calculated based on the vehicle speed $V_b$ and the wheel speed $V^i_w$ of each of the wheel 3R, 3L, 4R and 4L, using the following formula:

$$S^i_a = (V^i_w / V_b) - 1.$$

Here, although only a common formula using a common symbol "i" representing all of the wheels is indicated above, the slip ratio of each of the wheel is individually calculated. Also, in the following description, only common formulas using the common symbol "i" to be used to calculate parameters of the wheels at the following steps will be explained for the sake of convenience, and the common symbol "i" will be used to represent all of the wheels.

Figure 12:
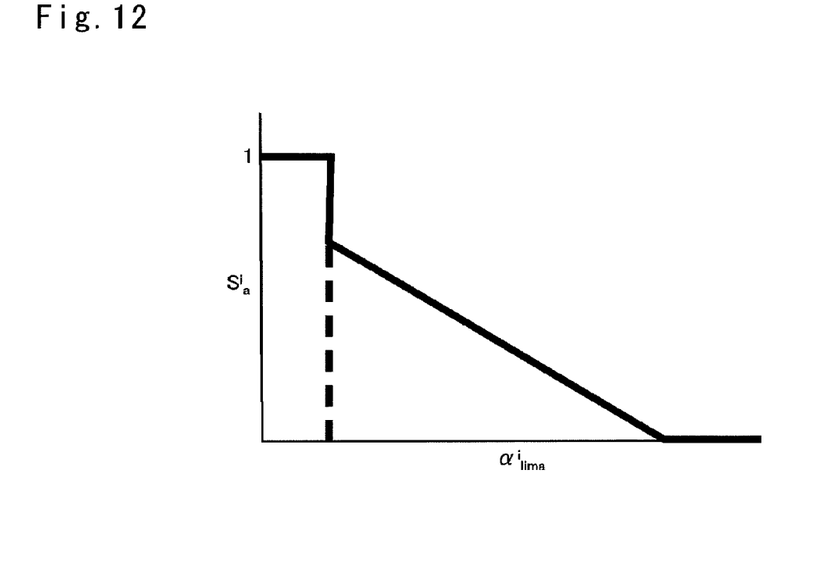
FIG. 12 shows one example of a map for calculating a restriction ratio of torque based on a slip ratio during propulsion.

Then, in order to execute the traction control, that is, in order to prevent an excessive delivery of the drive torque to the wheel slipping at the high slip ratio $S^i_a$, a restriction rate $\alpha^i_{lima}$ of the transmission torque to each of the wheel is calculated at step S15. Specifically, at step S15, the restriction rate $\alpha^i_{lima}$ of the transmission torque to each of the right front wheel 3R, the left front wheel 3L, the right rear wheel 4R and the left rear wheel 4L is individually calculated based on the slip ratio $S^i_a$ calculated at step S14 with reference to a map shown in FIG. 12. To this end, the map shown in FIG. 12 is prepared based on an experimental result, and stored in the first ECU 21. As can be seen from FIG. 12, the restriction rate $\alpha^i_{lima}$ is set to a constant value in a case that the slip ratio $S^i_a$ is greater than a predetermined value. By contrast, in a case that the slip ratio $S^i_a$ is smaller than the predetermined value, the restriction rate $\alpha^i_{lima}$ is increased with a reduction in the slip ratio $S^i_a$.

Thereafter, a command torque $T^i_{wla}$ to each of the right front wheel 3R, the left front wheel 3L, the right rear wheel 4R and the left rear wheel 4L is individually calculated at step S16 based on the transmission torque $T^i_w$ calculated at step S13 and the restriction rate $\alpha^i_{lima}$ calculated at step S15, using the following formula:

$$T^i_{wla} = T^i_w \cdot \alpha^i_{lima}.$$

By contrast, if the brake demand determination flag $F_{bk}$ is turned on so that the answer of step S12 is NO, the routine progresses to step S17 to calculate the transmission torque $T^i_w$ to each of the wheel 3R, 3L, 4R and 4L using the following formulas:

$$T^{fr}_w = \tfrac{1}{3} \cdot T_{dr} + \tfrac{2}{3} T^r_{di};$$

$$T^{fl}_w = \tfrac{1}{3} \cdot T_{dr} + \tfrac{2}{3} T^l_{di};$$

$$T^{rr}_w = \tfrac{1}{6} \cdot T_{dr} + \tfrac{1}{3} T^r_{di}; \text{ and}$$

$$T^{rl}_w = \tfrac{1}{6} \cdot T_{dr} + \tfrac{1}{3} T^l_{di}.$$

In this case, a brake torque is to be generated at step S17. That is, contrary to step S13, a larger vertical force is applied to each of the right front wheel 3R and the left front wheel 3L. In this case, therefore, a split ratio of the transmission torque $T^{fr}_w$ to the right front wheel 3R to the transmission torque $T^{rr}_w$ to the right rear wheel 4R is set to a ratio of 2 to 1. Likewise, a split ratio of the transmission torque $T^{fl}_w$ to the left front wheel 3L to the transmission torque $T^{rl}_w$ to the left rear wheel 4L is also set to a ratio of 2 to 1. However, the split ratio of the transmission torque to the front wheel to the transmission torque to the right rear wheel may be adjusted according to need.

Then, at step S18, a slippage of each wheel caused by generating the brake torque is detected at step S18. At step S18, specifically, a slip ratio $S^i_b$ of each of the right front wheel 3R, the left front wheel 3L, the right rear wheel 4R and the left rear wheel 4L is individually calculated based on the vehicle speed $V_b$ and the wheel speed $V^i_w$ of each of the wheel 3R, 3L, 4R and 4L, using the following formula:

$$S^i_b = 1 - (V^i_w/V_b).$$

Figure 13:
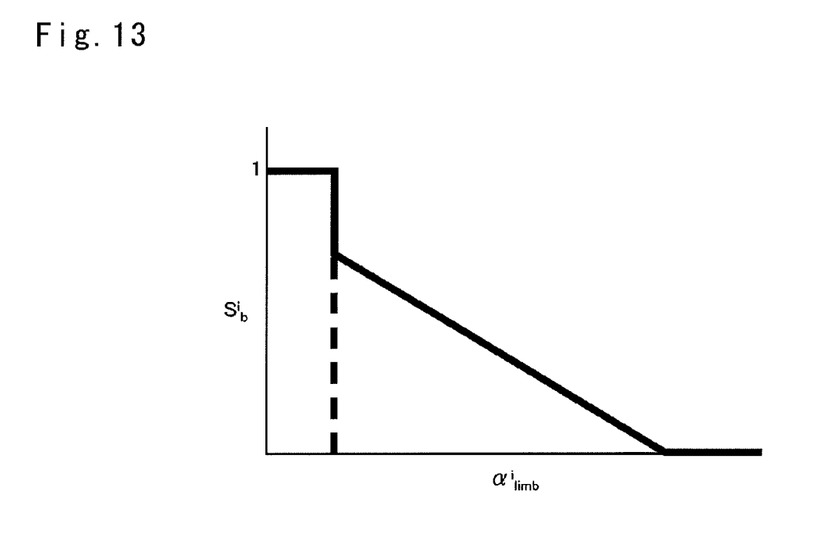
FIG. 13 shows one example of a map for calculating a restriction ratio of torque based on a slip ratio during braking.

Then, in order to execute the anti-lock brake control, that is, in order to prevent an excessive delivery of the brake torque to the wheel slipping at the high slip ratio $S^i_b$, a restriction rate $\alpha^i_{limb}$ of the transmission torque to each of the wheel is calculated at step S19. Specifically, at step S19, the restriction rate $\alpha^i_{limb}$ of the transmission torque to each of the right front wheel 3R, the left front wheel 3L, the right rear wheel 4R and the left rear wheel 4L is individually calculated based on the slip ratio $S^i_b$ calculated at step S18 with reference to a map shown in FIG. 13. To this end, the map shown in FIG. 13 is prepared based on an experimental result, and stored in the first ECU 21. As can be seen from FIG. 13, the restriction rate $\alpha^i_{limb}$ is also set to a constant value in a case that the slip ratio $S^i_b$ is greater than a predetermined value. By contrast, in a case that the slip ratio $S^i_b$ is smaller than the predetermined value, the restriction rate $\alpha^i_{limb}$ is also increased with a reduction in the slip ratio $S^i_b$.

Thereafter, a command torque $T^i_{wlb}$ to each of the right front wheel 3R, the left front wheel 3L, the right rear wheel 4R and the left rear wheel 4L is individually calculated at step S20 based on the transmission torque $T^i_w$ calculated at step S17 and the restriction rate $\alpha^i_{limb}$ calculated at step S19, using the following formula:

$$T^i_{wlb} = T^i_w \cdot \alpha^i_{limb}.$$

Thus, in the case of generating the drive torque, the transmission torque $T^i_w$ to each of the right front wheel 3R, the left front wheel 3L, the right rear wheel 4R and the left rear wheel 4L is individually calculated at step S13, and the command torque $T^i_{wla}$ to each wheel is individually calculated by multiplying the transmission torque $T^i_w$ by the restriction rate $\alpha^i_{lima}$. That is, the transmission torque $T^i_w$ is corrected based on the slip ratio $S^i_a$. Likewise, in the case of generating the brake torque, the transmission torque $T^i_w$ to each of the right front wheel 3R, the left front wheel 3L, the right rear wheel 4R and the left rear wheel 4L is individually calculated at step S17, and the command torque $T^i_{wlb}$ to each wheel is individually calculated by multiplying the transmission torque $T^i_w$ by the restriction rate $\alpha^i_{limb}$. That is, the transmission torque $T^i_w$ is corrected based on the slip ratio $S^i_b$.

Figure 4:
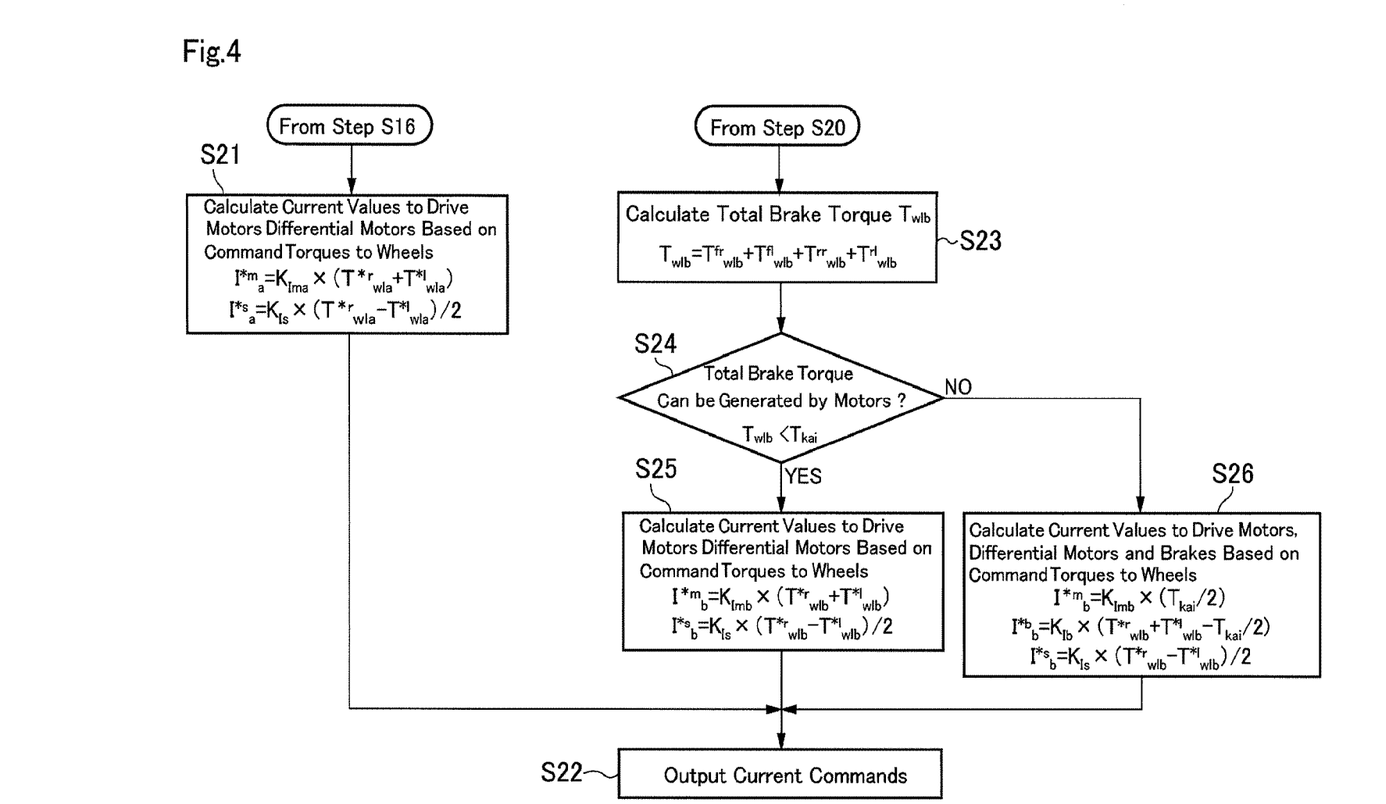
FIG. 4 is a flowchart showing one example of a routine for calculating current values supplied to the drive motors, the differential motors, and the brake devices based on the command torques to the wheels.

Then, the current value $I^{*m}$ supplied to each of the drive motor 1 and 2, the current value $I^{*s}$ supplied to each of the differential motor 6 and 20, and the current value $I^{*b}$ supplied to each of the brake device 7 and 18 are calculated based on the command torque $T^i_{wla}$ calculated at step S16 and the command torque $T^i_{wlb}$ calculated at step S20. In the case of generating the drive torque, the current value $I^{*m}_a$ supplied to each of the drive motor 1 and 2, and the current value $I^{*s}_a$ supplied to each of the differential motor 6 and 20 are calculated at step S21 based on the command torque $T^i_{wla}$ calculated at step S16, using the following formulas:

$$I^{*m}_a = K_{Ima} \cdot (T^{*r}_{wla} + T^{fl}_{wla});\text{ and}$$

$$I^{*s}_a = K_{Is} \cdot (T^{*r}_{wla} - T^i_{wla})/2$$

where $K_{Ima}$ is a transmission constant to transform the required torques of the first drive motor 1 and the second drive motor 2 into the current values, that is stored in the first ECU 21. In the above formulas, "*" represents both of the front wheel and the rear wheel. Specifically, the current value $I^{*m}_a$ to the first drive motor 1 is calculated by adding the command torques to the right front wheel 3R and the left front wheel 3L, and multiplying the total command torque by the constant $K_{Ima}$. Likewise, the current value $I^{*m}_a$ to the second drive motor 2 is calculated by adding the command torques to the right rear wheel 4R and the left rear wheel 4L, and multiplying the total command torque by the constant $K_{Ima}$. On the other hand, the current value $I^{*s}_a$ supplied to the first differential motor 6 is calculated by dividing a difference between the command torques to the right front wheel 3R and the left front wheel 3L, and by multiplying the obtained value by the constant $K_{Is}$. Likewise, the current value $I^{*s}_a$ supplied to the second differential motor 20 is calculated by dividing a difference between the command torques to the right rear wheel 4R and the left rear wheel 4L, and by multiplying the obtained value by the constant $K_{Is}$.

Thereafter, at step S22, the current value $I^{*m}_a$ and $I^{*s}_a$ thus calculated at step S21 are supplied to the first drive motor 1 and the second drive motor 2, and to the first differential motor 6 and the second differential motor 20.

By contrast, in the case that the driver intends to decelerate the vehicle Ve so that the answer of step S12 is NO, a total brake torque $T_{wlb}$ is calculated at step S23 by adding command torques $T^{fr}_{wlb}$ to the right front wheel 3R, $T^{fl}_{wlb}$ to the left front wheel 3L, $T^{rr}_{wlb}$ to the right rear wheel 4R, and $T^{rl}_{wlb}$ to the left rear wheel 4L. Then, at step S24, it is determined whether or not the total brake torque $T_{wlb}$ calculated at step S23 can be generated by the first drive motor 1 and the second drive motor 2. Specifically, it is determined whether or not the total brake torque $T_{wlb}$ can be generated by regenerating energy by the first drive motor 1 and the second drive motor 2 as expressed by the following inequality:

$$T_{wlb} < T_{kai}$$

where $T_{kai}$ is a maximum value of a regenerative torque (i.e., a limit torque) possible to be generated by the first drive motor 1 and the second drive motor 2. That is, the $T_{kai}$ is governed by capacities of the first drive motor 1 and the second drive motor 2.

If the total brake torque $T_{wlb}$ is smaller than the limit torque $T_{kai}$ so that the answer of step S24 is YES, the current value $I^{*m}_b$ supplied to each of the drive motor 1 and 2, and the current value $I^{*s}_b$ supplied to each of the differential motor 6 and 20 are calculated at step S25 based on the command torque $T^i_{wlb}$ calculated at step S20, using the following formulas:

$$I^{*m}_b = K_{Imb} \cdot (T^{*r}_{wlb} + T^i_{wlb});\text{ and}$$

$$I^{*s}_b = K_{Is} \cdot (T^{*r}_{wlb} - T^i_{wlb})/2$$

where $K_{Imb}$ is a transmission constant to transform the required torques of the first drive motor 1 and the second drive motor 2 into the current values, that is also stored in the first ECU 21. Thus, at step S25, the current values are calculated by similar procedures as step S21.

By contrast, if the total brake torque $T_{wlb}$ is greater than the limit torque $T_{kai}$ so that the answer of step S24 is NO, the maximum regenerative torque is generated by the first drive motor 1 and the second drive motor 2, and a shortage of the brake torque to the total brake torque $T_{wlb}$ is generated by the first brake device 7 and the second brake device 18. To this end, the current value $I^{*m}_b$ supplied to each of the drive motor 1 and 2, a current value $I^{*b}_b$ supplied to each of the brake device 7 and 18, and the current value $I^{*s}_b$ supplied to each of the differential motor 6 and 20 are calculated at step S26, using the following formulas:

$$I^{*m}_b = K_{Imb} \cdot (T_{kai}/2);$$

$$I^{*b}_b = K_{Ib} \cdot (T^{*r}_{wlb} + T^l_{wlb} - T_{kai}/2); \text{ and}$$

$$I^{*s}_b = K_{Is} \cdot (T^{*r}_{wlb} - T^l_{wlb})/2.$$

Thus, as step S21, the current value $I^{*b}_b$ supplied to each of the brake device 7 and 18 is also calculated based on a difference between the command torques to the right front wheel 3R and the left front wheel 3L, and a difference between the command torques to the right rear wheel 4R and the left rear wheel 4L. In addition, the current value $I^{*s}_b$ supplied to each of the differential motor 6 and 20 is calculated by the same procedure as at step S25.

Thereafter, at step S22, the current value $I^{*m}_b$, $I^{*b}_b$ and $I^{*s}_b$ thus calculated at step S26 are supplied to the first drive motor 1 and the second drive motor 2, to the first differential motor 6 and the second differential motor 20, and to the first brake device 7 and the second brake device 18.

Thus, according to the preferred embodiment shown in FIGS. 1 to 4, the current values $I^{*m}_a$ and $I^{*m}_b$ supplied to the first drive motor 1 and the second drive motor 2, and the current values $I^{*s}_a$ and $I^{*s}_b$ supplied to the first differential motor 6 and the second 20 differential motor are calculated based on the slip ratios $S^i_a$ and $S^i_b$ of each of the right front wheel 3R, the left front wheel 3L, the right rear wheel 4R and the left rear wheel 4L. According to the preferred embodiment, therefore, even if the torque split ratio is changed and hence the torque of one of the right and left wheels is changed, the torque of the other wheel will not be increased or decreased excessively. For this reason, running stability of the vehicle can be improved.

In the case that the total brake torque $T_{wlb}$ can be established by the first drive motor 1 and the second drive motor 2, the current value $I^{*m}_b$ is controlled in such a manner as to establish the total brake torque $T_{wlb}$ only by the first drive motor 1 and the second drive motor 2. For this reason, an energy regeneration efficiency can be improved. By contrast, even if the total brake torque $T_{wlb}$ cannot be established only by the first drive motor 1 and the second drive motor 2, the current value $I^{*m}_b$ is controlled in such a manner as to establish the maximum regenerative torque by the first drive motor 1 and the second drive motor 2, and to establish the shortage of the brake torque to the total brake torque $T_{wlb}$ by the first brake device 7 and the second brake device 18. That is, an energy regeneration efficiency can be improved while reducing the brake torques to be established by the first brake device 7 and the second brake device 18. For this reason, the first brake device 7 and the second brake device 18 can be downsized, or damages on the first brake device 7 and the second brake device 18 can be limited.

During turning of the vehicle Ve, the distribution torques $T^r_{di}$ to the right wheel and the distribution torque $T^l_{di}$ to the left wheel are calculated at step S11 in such a manner that the torques to be delivered to the right wheels and the left wheels are increased and decreased in the same amount. For this reason, turning performance of the vehicle Ve can be improved without reducing longitudinal acceleration.

Further, the current values $I^{*m}_a$ and $I^{*m}_b$ supplied to the first drive motor 1 and the second drive motor 2, the current values $I^{*s}_a$ and $I^{*s}_b$ supplied to the first differential motor 6 and the second 20 differential motor, and the current value $I^{*b}_b$ supplied to each of the brake device 7 and 18 are calculated based on the transmission torques to the wheels 3R, 3L, 4R and 4L. In addition, the torque split ratio to the right wheel 3R (or 4R) and the left wheel 3L (or 4L) can be controlled by the differential motor 6 (or 20) without causing a frictional loss. For this reason, powers of the first drive motor 1 and the second drive motor 2 can be delivered efficiently to the wheels 3R, 3L, 4R and 4L without causing a power loss.

Although the above exemplary embodiments of the present application have been described, it will be understood by those skilled in the art that the present application should not be limited to the described exemplary embodiments, and various changes and modifications can be made within the spirit and scope of the present application. For example, the control system according to the preferred embodiment may be applied not only to the four-wheel drive vehicle as shown in FIG. 5 but also to a front drive vehicle and a rear drive vehicle. In this case, the coefficients used in the calculations of the torques of the right wheel and the left wheel at steps S13 and S17 are set to 1 to 1. In addition, right and left driven wheels may be connected through a differential gear unit, and a brake device may be arranged in the differential gear unit. In this case, brake torques of the right wheel and the left wheel may also be calculated by the procedures shown in FIGS. 1 to 4.

What is claimed is:

1. A driving force control system for a vehicle comprising:
   a drive motor;
   a differential unit having a plurality of rotary elements that distributes torque delivered from the drive motor to a right wheel and a left wheel;
   a differential motor that is connected to any one of the rotary elements of the differential unit, and that controls a split ratio of the torque distributed to the right wheel and the left wheel through the differential unit by generating torque;
   a controller that controls electric currents supplied to the drive motor and the differential motor; and
   a brake device that is connected to any one of the rotary elements of the differential unit to apply a brake torque to the rotary element in accordance with a current applied thereto,
   wherein the drive motor includes a motor having a generating function,
   wherein the controller is configured to
   control a current value supplied to the brake device,
   calculate a drive torque that is required by a driver including an accelerating torque or a decelerating torque based on an operation executed by the driver,
   calculate target torques to be delivered to the right wheel and the left wheel based on the drive torque and data relating to an attitude of the vehicle,
   correct the target torques based on a detected slip ratio of each of the right wheel and the left wheel,
   calculate a first current value supplied to the drive motor based on a total torque of the corrected target torque to be delivered to one of the wheels and the corrected target torque to be delivered to the other wheel,
   calculate a second current value supplied to the differential motor based on a difference between the corrected target torque to be delivered to one of the wheels and the corrected target torque to be delivered to the other wheel,
   control the drive motor based on the first current value and the differential motor based on the second current value,
   calculate a third current value supplied to the brake device based on the total torque of the corrected target torques, and calculate the first current value in such a manner as to generate a limit torque of the drive motor, and to calculate the third current value in such a manner as to generate a difference between the total torque of the corrected target torques and the limit torque of the drive motor by the brake device, in a case that the total torque of the corrected target torques is a brake torque that is greater than the limit torque of the drive motor.

2. The driving force control system for a vehicle as claimed in claim 1, wherein the controller is further configured to calculate the target torques in such a manner as to increase the torque of one of the wheels while decreasing the torque of the other wheel in the same amount during turning of the vehicle.

3. The driving force control system for a vehicle as claimed in claim 1, wherein the operation includes an accelerating operation or a braking operation executed by the driver.

4. The driving force control system for a vehicle as claimed in claim 1, wherein the data relating to an attitude of the vehicle includes a yaw rate of the vehicle.

5. The driving force control system for a vehicle as claimed in claim 1, wherein the slip ratio includes a ratio between a vehicle speed and a wheel speed of each of the wheels.

* * * * *